(No Model.)

C. R. STANTON.
AUTOMATIC GRAIN WEIGHER.

No. 431,533. Patented July 1, 1890.

Witnesses:
M. P. Smith
R. H. Orwig

Inventor:
Charles R. Stanton
By Thomas G. Orwig, Atty.

UNITED STATES PATENT OFFICE.

CHARLES R. STANTON, OF STUART, IOWA, ASSIGNOR OF ONE-HALF TO SAMUEL MAAG, OF SAME PLACE.

AUTOMATIC GRAIN-WEIGHER.

SPECIFICATION forming part of Letters Patent No. 431,533, dated July 1, 1890.

Application filed February 5, 1889. Serial No. 298,784. (No model.)

*To all whom it may concern:*

Be it known that I, CHARLES R. STANTON, a citizen of the United States, residing at Stuart, in the county of Guthrie and State of Iowa, have invented an Improved Automatic Grain-Weigher, of which the following is a specification, reference being had to the accompanying drawings, and to the figures and letters of reference thereon.

The object of this invention is to provide a simple automatic device adapted to weigh *in transitu* cereals or kindred products as they pass from the conveyer or chute to the wagons; and my invention consists of the improved apparatus hereinafter described, pointed out in my claim, and illustrated in the accompanying drawings, forming part of this specification.

Figure 1:
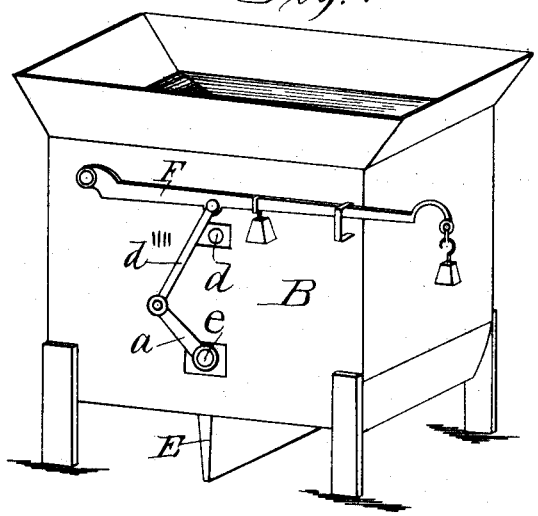
Figure 2:
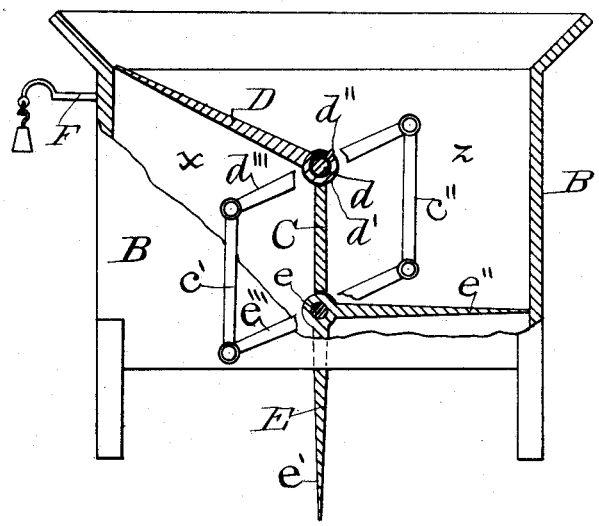

Figure 1 is a perspective view of my apparatus, while Fig. 2 represents a side elevation, partly in section.

Similar letters of reference refer to corresponding parts.

B, in the drawings, represents a bottomless duplex grain-measure of a convenient size that is provided at its upper end with a suitable hopper and centrally of its length with a fixed partition C, which extends approximately half the height of the measure, thus dividing it into two grainways. (Marked $x$ and $z$.) A rock-shaft $d$, suitably journaled, works above the partition C and carries the directing-gate D, which is revoluble upon and oscillated by said shaft. The directing-gate is connected to the rock-shaft $d$ by means of a sleeve $d'$, which is provided with an elongated opening in which works a suitable pin $d''$, by means of which the directing-gate is operated. Opposite the rock-shaft $d$ and below the partition C is fixed the rock-shaft $e$, which is connected to a duplex L-shaped drop-gate E, the blades $e'$ $e''$ of which are braced at right angles to one another and are adapted in working to alternately close the grainways $x$ and $z$, as will be understood by referring to Fig. 2 of the drawings. At one side of the measure the rock-shafts $d$ and $e$ are connected by means of the walking-beams $d'''$ $e'''$ and the rods $c$ $c'$. The rock-shaft $e$ is further provided with the lever-arm $a$, which is fastened by means of the link $d''''$ to a graduated scale-beam F.

At rest, the directing-gate D is adapted to close the upper end of one of the grainways, while the drop-gate E closes the lower portion of the opposite way, thus converting one of the ways into a chamber, as shown in Fig. 2.

The quantity of grain to be weighed having been determined the grain would be fed to the measure, where the operation would be as follows: The stream of grain which is delivered to the hopper with regularity would partially strike the directing-gate D and be diverted into the chamber opposite, where it would rest upon one of the blades of the gate E. When the grain fed into this compartment would exceed in weight the quantity represented upon the scale-beam, the drop-gate dips and the grain falls into a receptacle below. The rock-shaft $d$, being connected to the lower shaft $e$, would work in a corresponding direction, the pin $d''$ operating along the elongated opening of the sleeve $d'$, and a minute after the drop-gate began unloading would carry the directing-gate in the direction indicated by the arrow, thus closing the upper end of the opposite grainway, while the second blade of the drop-gate would, in the interval, have closed the lower end of the grainway opened by the directing-gate, and in this manner the operation would be continued.

I am aware that a hopper or measure has been suspended in a case and operative devices combined therewith to automatically weigh grain as it was passed through the machine; but my manner of combining operative devices direct with a duplex measure that remains stationary while grain is being measured and automatically weighed therein is novel and greatly advantageous.

Having thus described my invention, what I claim as new, and desire to secure by Letters Patent, is—

In a measure for weighing grain having a fixed partition C, the rock-shaft $d$, having a fixed pin $d''$, the sleeve $d'$, having a fixed gate D, the rock-shaft $e$, having fixed gates $e'$ and $e''$, connected with the shaft $d$ by means of the arms or beams $d'''$ and $e'''$, and the scale-beam F, connected with the shaft $e$ by means of the arm $a$ and link $d''''$, substantially as shown and described.

CHARLES R. STANTON.

Witnesses:
 SAMUEL MAAG,
 R. S. GREGG.